United States Patent
Erhart et al.

(10) Patent No.: US 8,005,199 B2
(45) Date of Patent: Aug. 23, 2011

(54) INTELLIGENT MEDIA STREAM RECOVERY (75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1224 days.

(21) Appl. No.: 11/465,480

(22) Filed: Aug. 18, 2006

(65) Prior Publication Data

US 2008/0056456 A1 Mar. 6, 2008

(51) Int. Cl.
*H04M 11/00* (2006.01)
*H04B 1/18* (2006.01)
*H04L 12/54* (2006.01)
*H04N 7/173* (2011.01)

(52) U.S. Cl. ........... 379/101.01; 455/186.1; 370/429; 725/88

(58) Field of Classification Search .......... 455/3.01, 455/3.06, 132, 142, 186.1, 318, 179.1, 185.1; 725/89, 102, 92; 370/429
See application file for complete search history.

(56) References Cited

U.S. PATENT DOCUMENTS

| | | | |
|---|---|---|---|
| 5,918,002 A | 6/1999 | Klemets et al. | |
| 6,148,005 A | 11/2000 | Paul et al. | |
| 6,289,054 B1 | 9/2001 | Rhee | |
| 6,865,374 B2 | 3/2005 | Kalluri | |
| 7,017,120 B2 * | 3/2006 | Shnier | 715/783 |
| 7,058,376 B2 * | 6/2006 | Logan et al. | 455/186.1 |
| 7,093,277 B2 | 8/2006 | Perlman | |
| 7,237,033 B2 * | 6/2007 | Weigand et al. | 709/231 |
| 7,401,351 B2 * | 7/2008 | Boreczky et al. | 725/88 |
| 7,694,013 B2 * | 4/2010 | Weigand et al. | 709/238 |
| 2004/0141600 A1 * | 7/2004 | Lee | 379/100.01 |
| 2005/0114529 A1 * | 5/2005 | Lambert | 709/228 |
| 2006/0277581 A1 * | 12/2006 | Eliyahu et al. | 725/88 |
| 2007/0201502 A1 * | 8/2007 | Abramson | 370/429 |
| 2007/0204115 A1 * | 8/2007 | Abramson | 711/154 |

FOREIGN PATENT DOCUMENTS

| WO | 02088885 A2 | 11/2002 |
|---|---|---|
| WO | 2004034689 A2 | 4/2004 |

OTHER PUBLICATIONS

Mannekens, Jan, "EP Application No. 07015578.3 Search Report Jun. 18, 2009", , Publisher: EPO, Published in: EP.

* cited by examiner

*Primary Examiner* — Davetta W Goins
*Assistant Examiner* — Mohammad Islam
(74) *Attorney, Agent, or Firm* — DeMont & Breyer, LLC (57) ABSTRACT

An interactive voice response (IVR) system is disclosed that can intelligently resume delivery of interrupted media streams. The IVR system determines if any prior portions of an interrupted media stream should be re-transmitted after the interruption has ceased, based on one or more of (i) the contents of the interrupted stream, (ii) the duration of the interruption, and (iii) the state of a software application of the interactive voice response (IVR) system.

20 Claims, 9 Drawing Sheets

```
<?xml version="1.0"?>
<vxml version="2.0">
    <menu id="menu1" scope="document" dtmf="true">
        <prompt> Welcome to XYZ Corp! Please choose one of the following options: <enumerate/> </prompt>
        <choice dtmf="1"  next="#formSales">   Sales,     </choice>
        <choice dtmf="*2" next="#formMarket">  Marketing, </choice>
        <choice dtmf="3"  next="#formSupport"> Support    </choice>
    </menu>
    <form id="formSales">
        <field name="SalesInput">
            <prompt>
                I will now transfer you to sales
            </prompt>
        </field>
    </form>
    <form id="formMarket">
        <field name="MarketInput">
            <prompt> I will now transfer you to marketing </prompt>
        </field>
    </form>
    <form id="formSupport">
        <field name="SupportInput">
            <prompt> I will now transfer you to support </prompt>
        </field>
    </form>
</vxml>
```

```
<?xml version="1.0"?>
<vxml version="2.0">
    <menu id="menu1" scope="document" dtmf="true">
        <prompt> Welcome to XYZ Corp! Please choose one of the following options: <enumerate/> </prompt>
        <choice dtmf="1"  next="#formSales">   Sales,     </choice>
        <choice dtmf="*2" next="#formMarket">  Marketing, </choice>
        <choice dtmf="3"  next="#formSupport"> Support    </choice>
    </menu>
    <form id="formSales">
        <group>
            <prompt>
                <audio src="http://media.svr/salesAudioStream.mp3" desc="salesAudioDesc.xml"/>
            </prompt>
            <prompt>
                <video src="http://media.svr/salesVideoStream.3gp" desc="salesVideoDesc.xml" </video>
            </prompt>
        </group>
        <field name="SalesInput">
            <prompt>
                I will now transfer you to sales
            </prompt>
        </field>
    </form>

...

<recovery-ruleset filename="IVRrecoveryRules.xml">

</vxml>
```

Figure 5

```
<?xml version="1.0"?>
<mediastream type=video>
    <segment filename="priusAd.3gp"         startTime=00:00:00 endTime=00:00:45 segmentType="ad">
    <segment filename="trailer1.3gp"        startTime=00:00:46 endTime=00:04:10 segmentType="trailer">
    <segment filename="trailer2.3gp"        startTime=00:04:11 endTime=00:06:26 segmentType="trailer">
    <segment filename="prairieAd.3gp"       startTime=00:06:27 endTime=00:07:29 segmentType="ad">
    <segment filename="IncTruthPPpresent"   startTime=00:07:30 endTime=01:51:43 segmentType="documentary">
    <segment filename="cartoonShort1"       startTime=01:51:44 endTime=01:56:50 segmentType="trailer">
</media>
<mediastream type=audio>
    <segment filename="voiceLogin.php"   startTime=00:00:00 endTime=*        segmentType="program">
    <segment filename="starSpangled.mp3" startTime=*        endTime=00:01:35 segmentType="song">
    <segment filename="welcome.mp3"      startTime=00:01:36 endTime=00:05:12 segmentType="trailer">
    <segment filename="orientation.mp3"  startTime=00:05:13 endTime=01:22:19 segmentType="instruction">
    <segment filename="marinesHymn.mp3"  startTime=01:22:20 endTime=01:24:48 segmentType="song">
    <segment filename="survey.php"       startTime=01:24:49 endTime=*        segmentType="program">
</media>
```

Figure 6

```xml
<?xml version="1.0"?>
<rule>
    <and-condition>
        <segmentType="ad">
        <segment-length         operator=">" value="10" units="sec">
        <interruption-duration operator=">" value="5"  units="min">
    </and-condition>
    <action type="re-transmit">
</rule>
<rule>
    <and-condition>
        <segmentType="ad">
        <segment-length operator="<=" value="10" units="sec">
    </and-condition>
    <action type="re-transmit">
</rule>
<rule>
    <and-condition>
        <or-condition>
            <segmentType="documentary">
            <segmentType="drama">
        </or-condition>
        <interruption-duration operator=">" value="10"  units="min">
    </and-condition>
    <action type="resume" backup="5" units="min">
</rule>
<rule>
    <and-condition>
        <or-condition>
            <segmentType="documentary">
            <segmentType="drama">
        </or-condition>
        <interruption-duration operator="<=" value="10"  units="min">
    </and-condition>
    <action type="resume" backup="45" units="sec">
</rule>
```

INTELLIGENT MEDIA STREAM RECOVERY

FIELD OF THE INVENTION

The present invention relates to telecommunications in general, and, more particularly, to intelligently resuming transmission of media streams after interruptions in delivery.

BACKGROUND OF THE INVENTION

Many enterprises employ an interactive voice response (IVR) system that handles calls from telecommunications terminals. An interactive voice response system typically presents a hierarchy of menus to the caller, and prompts the caller for input to navigate the menus and to supply information to the IVR system. For example, a caller might touch the "3" key of his terminal's keypad, or say the word "three", to choose the third option in a menu. Similarly, a caller might specify his bank account number to the interactive voice response system by inputting the digits via the keypad, or by saying the digits. In many interactive voice response systems the caller can connect to a person in the enterprise by either selecting an appropriate menu option, or by entering the telephone extension associated with that person.

Figure 1:
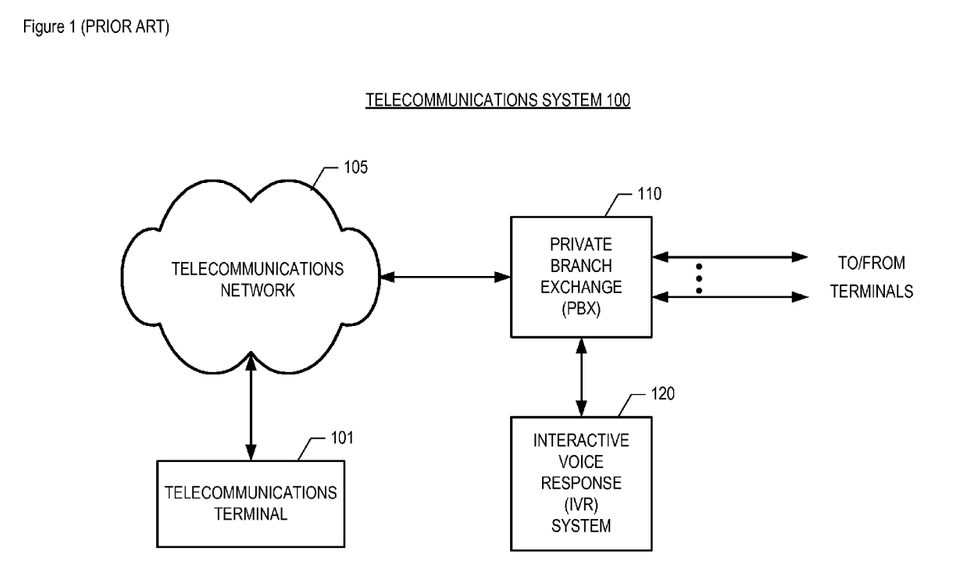
FIG. 1 depicts telecommunications system 100 in accordance with the prior art.

FIG. 1 depicts telecommunications system 100 in accordance with the prior art. Telecommunications system 100 comprises telecommunications terminal 101, telecommunications network 105, private branch exchange (PBX) 110, and interactive voice response system 120, interconnected as shown.

Telecommunications terminal 101 is one of a telephone, a notebook computer, a personal digital assistant (PDA), etc. and is capable of placing and receiving calls via telecommunications network 105.

Telecommunications network 105 is a network such as the Public Switched Telephone Network [PSTN], the Internet, etc. that carries calls to and from telecommunications terminal 101, private branch exchange 110, and other devices not show in FIG. 1. A call might be a conventional voice telephony call, a text-based instant messaging (IM) session, a Voice over Internet Protocol (VoIP) call, etc.

Private branch exchange (PBX) 110 receives incoming calls from telecommunications network 105 and directs the calls to interactive voice response (IVR) system 120 or to one of a plurality of telecommunications terminals within the enterprise, depending on how private branch exchange 110 is programmed or configured. For example, in an enterprise call center, private branch exchange 110 might comprise logic for routing calls to service agents' terminals based on criteria such as how busy various service agents have been in a recent time interval, the telephone number called, and so forth. In addition, private branch exchange 110 might be programmed or configured so that an incoming call is initially routed to interactive voice response (IVR) system 120, and, based on caller input to IVR system 120, subsequently redirected back to PBX 110 for routing to an appropriate telecommunications terminal within the enterprise. Private branch exchange (PBX) 110 also receives outbound signals from telecommunications terminals within the enterprise and from interactive voice response (IVR) system 120, and transmits the signals on to telecommunications network 105 for delivery to a caller's terminal.

Interactive voice response (IVR) system 120 is a data-processing system that presents one or more menus to a caller and receives caller input (e.g., speech signals, keypad input, etc.), as described above, via private branch exchange 110. Interactive voice response system (IVR) 120 is typically programmable and performs its tasks by executing one or more instances of an IVR system application. An IVR system application typically comprises one or more scripts that specify what speech is generated by interactive voice response system 120, what input to collect from the caller, and what actions to take in response to caller input. For example, an IVR system application might comprise a top-level script that presents a main menu to the caller, and additional scripts that correspond to each of the menu options (e.g., a script for reviewing bank account balances, a script for making a transfer of funds between accounts, etc.).

A popular language for such scripts is the Voice extensible Markup Language (abbreviated VoiceXML or VXML). The Voice extensible Markup Language is an application of the extensible Markup Language, abbreviated XML, which enables the creation of customized tags for defining, transmitting, validating, and interpretation of data between two applications, organizations, etc. The Voice extensible Markup Language enables dialogs that feature synthesized speech, digitized audio, recognition of spoken and keyed input, recording of spoken input, and telephony. A primary objective of VXML is to bring the advantages of web-based development and content delivery to interactive voice response system applications.

Figure 2:
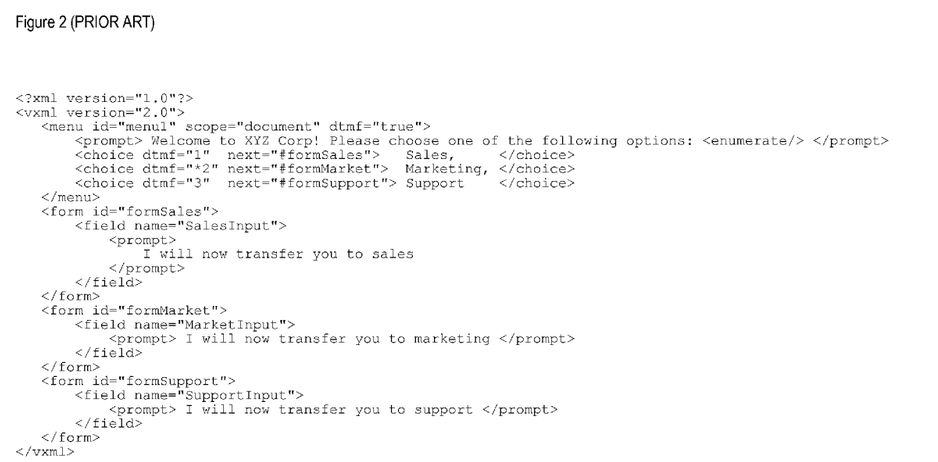
FIG. 2 depicts an illustrative Voice extensible Markup Language (VXML) script, in accordance with the prior art.

FIG. 2 depicts an illustrative Voice extensible Markup Language (VXML) script (also known as a VXML document or page), in accordance with the prior art. The VXML script, when executed by interactive voice response system 120, presents a menu with three options; the first option is for transferring the call to the sales department, the second option is for transferring the call to the marketing department, and the third option is for transferring the call to the customer support department. Audio content (in particular, synthesized speech) that corresponds to text between the <prompt> and </prompt> tags is generated by interactive voice response system 120 and transmitted to the caller.

SUMMARY OF THE INVENTION

As video displays become ubiquitous in telecommunications terminals, it can be advantageous to deliver video content to a telecommunications terminal during a call with an interactive voice response (IVR) system, in addition to audio content. For example, a user of a telecommunications terminal who is ordering apparel via an IVR system might receive a video stream related to a particular item (e.g., depicting a model who is wearing the item, depicting the different available colors for the item, etc.), or might receive a video advertisement that is unrelated to the current transaction. Furthermore, in some instances it might be desirable to deliver an audio stream (e.g., music, news, etc.) to the user, perhaps during silent periods in the call, or perhaps as background audio throughout the entire call.

The illustrative embodiment of the present invention enables an IVR system to deliver media streams of various media types (e.g., video, audio, etc.) to telecommunications terminals via the addition of extensions to the Voice extensible Markup Language (VXML) standard. Furthermore, in accordance with the illustrative embodiment, an interactive voice response (IVR) system will intelligently resume delivery of a particular media stream that is interrupted. For example, if, when an IVR system is delivering both an audio stream and a video stream to a calling terminal, the connection quality drops during the call so that the calling terminal continues to receive only the audio stream, the illustrative embodiment of the present invention is able to intelligently resume transmission of the video stream when the connection quality reverts to its prior level. In particular, the illustrative embodiment determines if any prior portions of an interrupted media stream—i.e., portions of the interrupted stream that were transmitted prior to the interruption—should be re-transmitted after the interruption has ceased.

In accordance with the illustrative embodiment, the determination is based on one or both of (i) the contents of the interrupted stream, and (ii) the duration of the interruption; and optionally, the state of a software application of the interactive voice response (IVR) system. For example, if an interruption occurs during a 30-second advertisement, playback of the interrupted media stream might resume at the beginning of the advertisement so that the entire advertisement is played contiguously (perhaps to comply with a contract with the advertiser). As a second example, a ten-second "spot" advertisement that was played at the beginning of the media stream might be played again after an interruption, prior to resuming transmission of the media stream. As a third example, a spot advertisement might be re-transmitted only after interruptions that last at least 45 seconds. As a fourth example, if an interruption occurs during a transaction (e.g., of an airline reservation application, etc.), the portion of the media stream that is associated with the transaction might be re-started from the beginning after the interruption. And as a fifth example, a media stream might be re-transmitted from the beginning of the entire stream when an interruption lasts for more than 15 minutes.

In accordance with the illustrative embodiment, each media stream has a description that specifies information about each portion of the media stream including a category (e.g., movie, advertisement, filler, transaction, etc.), a media type (e.g., audio, video, etc.), starting and ending times, etc. In addition, a set of rules is employed that indicates how media streams should be played after interruptions, based on one or more of: the media stream description, the duration of the interruption, the state of an application of the interactive voice response (IVR) system, and so forth.

The illustrative embodiment comprises: transmitting a media stream to a telecommunications terminal; receiving, during the transmission of the media stream, a first signal that indicates that the telecommunications terminal has stopped receiving the media stream; receiving, after the first signal, a second signal that indicates that the telecommunications terminal can resume receiving the media stream; and re-transmitting to the telecommunications terminal, in response to the second signal, one or more portions of the media stream that were already received by the telecommunications terminal prior to the first signal; wherein the one or more portions of the media stream are determined based on the contents of the media stream.

DETAILED DESCRIPTION

The terms appearing below are given the following definitions for use in this Description and the appended Claims.

For the purposes of the specification and claims, the term "call" is defined as an interactive communication involving one or more telecommunications terminal users. A call might be a traditional voice telephone call, an instant messaging (IM) session, a video conference, etc.

Figure 3:
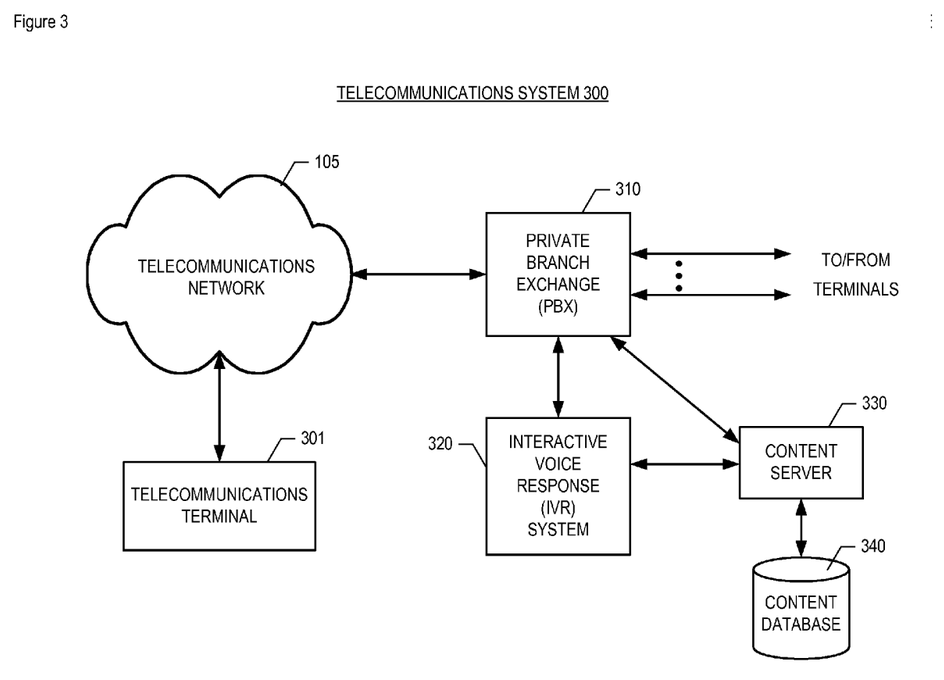
FIG. 3 depicts telecommunications system 300 in accordance with the illustrative embodiment of the present invention.

FIG. 3 depicts telecommunications system 300 in accordance with the illustrative embodiment of the present invention. Telecommunications system 300 comprises telecommunications terminal 301, telecommunications network 105, private branch exchange (PBX) 310, interactive voice response system 320, content server 330, and content database 340, interconnected as shown.

Telecommunications terminal 301 is one of a telephone, a notebook computer, a personal digital assistant (PDA), etc. and is capable of placing and receiving calls via telecommunications network 305. Telecommunications terminal 301 also has one or more transducers (e.g., a speaker, a video display, etc.) for outputting signals that are received via telecommunications network 105, in well-known fashion. In addition, telecommunications terminal 301 is capable of performing the tasks of FIG. 9, described below.

Private branch exchange (PBX) 310 provides all the functionality of private branch exchange (PBX) 110 of the prior art, and is also capable of receiving streamed content (e.g., audio, video, multimedia, etc.) from content server 330, of forwarding streamed content on to telecommunications network 105 for delivery to a caller's terminal, and of transmitting signals related to streamed content to content server 330. Furthermore, in addition to conventional telephony-based signaling and voice signals, private branch exchange 310 is also capable of transmitting and receiving Internet Protocol (IP) data packets, Session Initiation Protocol (SIP) messages, Voice over IP (VoIP) traffic, and stream-related messages (e.g., Real Time Streaming Protocol [RTSP] messages, etc.) to and from IVR system 320. It will be clear to those skilled in the art, after reading this specification, how to make and use private branch exchange (PBX) 310.

Interactive voice response system 320 provides all the functionality of interactive voice response system 120 of the prior art, and is also capable of transmitting commands to content server 330 (e.g., starting playback of a media stream, stopping playback of a media stream, queuing another media stream, etc.), of receiving information from content server 330 (e.g., an indication that playback of a media stream has begun, an indication that playback of a media stream has completed, etc.), and of receiving status information regarding the delivery of media streams to telecommunications terminal 301 (e.g., terminal 301 has stopped receiving a video stream due to reduced connection quality, terminal 301 can resume receiving an interrupted video stream, etc.). In addition, interactive voice response system 320 is capable of performing the tasks of FIGS. 5 through 9, described below. It will be clear to those skilled in the art, after reading this specification, how to make and use interactive voice response system 320.

Content server 330 is capable of retrieving content from content database 340, of buffering and delivering a media stream to a calling terminal via private branch exchange 310, of receiving commands from interactive voice response system 320 (e.g., to start playback of a media stream, to queue another media stream, etc.), of transmitting status information to interactive voice response system 320, and of generating content (e.g., dynamically generating a video of rendered text, etc.) in well-known fashion. It will be clear to those skilled in the art, after reading this specification, how to make and use content server 330.

Content database 340 is capable of storing a plurality of multimedia content (e.g., video content, audio content, etc.) and of retrieving content in response to commands from content server 330, in well-known fashion. It will be clear to those skilled in the art, after reading this specification, how to make and use content database 340.

As will be appreciated by those skilled in the art, some embodiments of the present invention might employ an architecture for telecommunications system 300 that is different than that of the illustrative embodiment (e.g., interactive voice response system 320 and content server 330 might reside on a common server, etc.). It will be clear to those skilled in the art, after reading this specification, how to make and use such alternative architectures.

Figure 4:
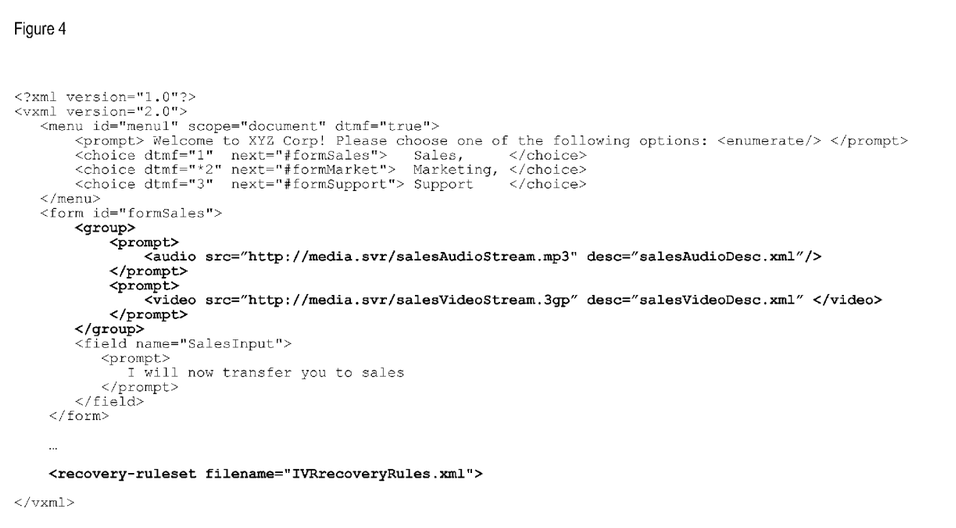
FIG. 4 depicts an illustrative Voice extensible Markup Language (VXML) script, in accordance with the illustrative embodiment of the present invention.

FIG. 4 depicts an illustrative Voice Extensible Markup Language (VXML) script, in accordance with the illustrative embodiment of the present invention. The script is the same as the script of FIG. 2 of the prior art, with the addition of lines of code depicted in boldface.

As shown in FIG. 4, the script now contains prompts that comprise audio and video streams in addition to speech prompts. In accordance with the illustrative embodiment, a VXML script uses a <group> block for concurrent delivery of multiple media streams that have different media types. For example, when interactive voice response system 320 processes the <group> block of FIG. 4, IVR system 320 will concurrently deliver audio stream productInfo.mp3 and video stream productDemo.3gp. (As will be appreciated by those skilled in the art, in some other embodiments of the present invention a tag or programming language construct other than a <group> block might be employed for specifying concurrent media streams.) The manner in which interactive voice response system 320 recovers from media stream interruptions is described below and with respect to FIGS. 7 through 9.

Figure 5:
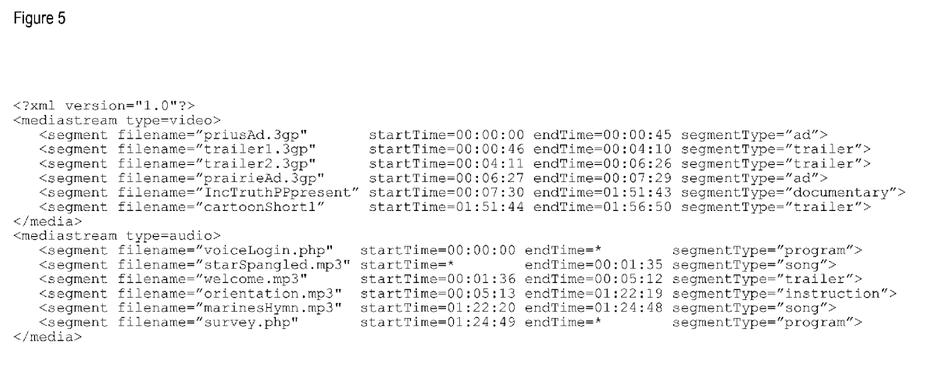
FIG. 5 depicts an illustrative XML description file for two media streams, in accordance with the illustrative embodiment of the present invention.

FIG. 5 depicts an illustrative XML description file for two media streams, in accordance with the illustrative embodiment of the present invention. As shown in FIG. 5, the file comprises a description for a video stream and an audio stream. Each description decomposes the stream into its constituent segments, specifying the source file of the segment, the starting and ending times in the stream, and the type of segment (e.g., an advertisement, a trailer, a song, etc.)

Figure 6:
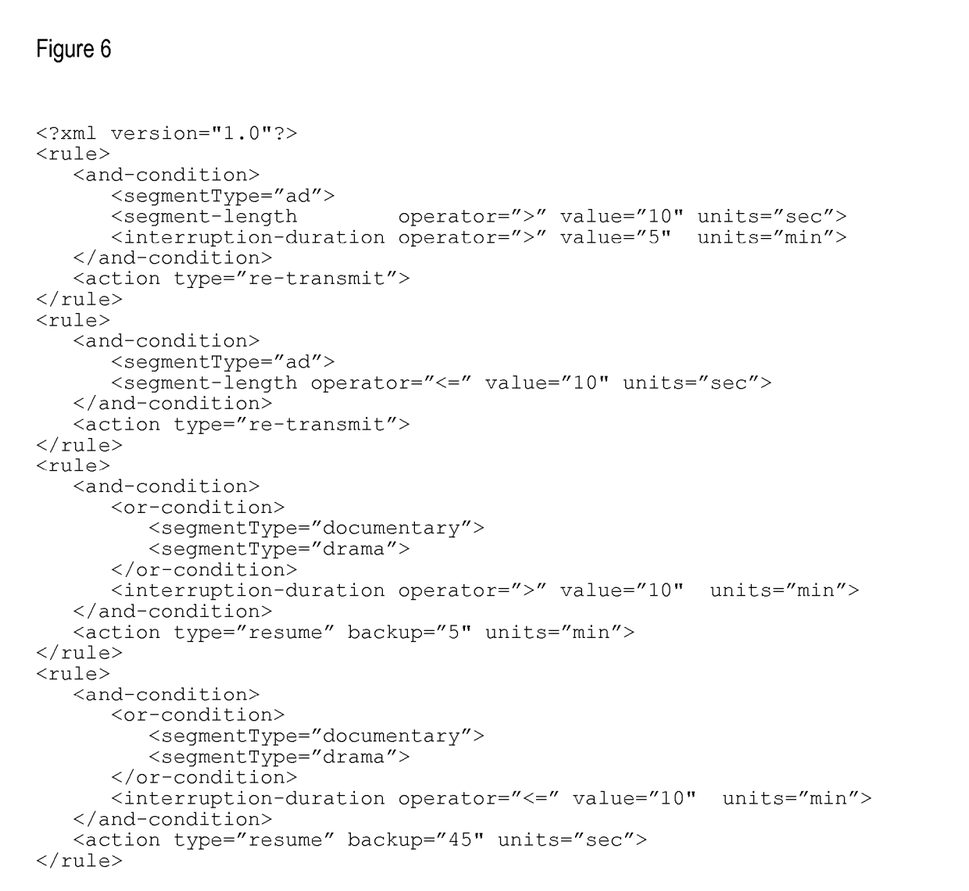
FIG. 6 depicts an illustrative XML file of recovery rules, in accordance with the illustrative embodiment of the present invention.

FIG. 6 depicts illustrative recovery rule file IVRRecoveryRules.xml, as specified in the script of FIG. 4, in accordance with the illustrative embodiment of the present invention. File IVRRecoveryRules.xml comprises four rules, which can be described in English as follows:

When an ad that is longer than 10 seconds is interrupted mid-stream and the interruption lasts for more than 5 minutes, the ad should be re-transmitted in its entirety when delivery is able to resume.

When an ad that is no more than 10 seconds in length is interrupted mid-stream, delivery of the ad should resume at the point at which the interruption occurred.

When a drama or a documentary is interrupted mid-stream and the interruption is longer than 10 minutes, then when delivery is able to resume the stream should be "backed up" 5 minutes from the point of interruption.

When a drama or a documentary is interrupted mid-stream and the interruption lasts for 10 minutes or less, then when delivery is able to resume the stream should be "backed up" 45 seconds from the point of interruption.

As will be appreciated by those skilled in the art, in some other embodiments of the present invention an alternative system of tags might be employed to specify recovery rules.

Figure 7:
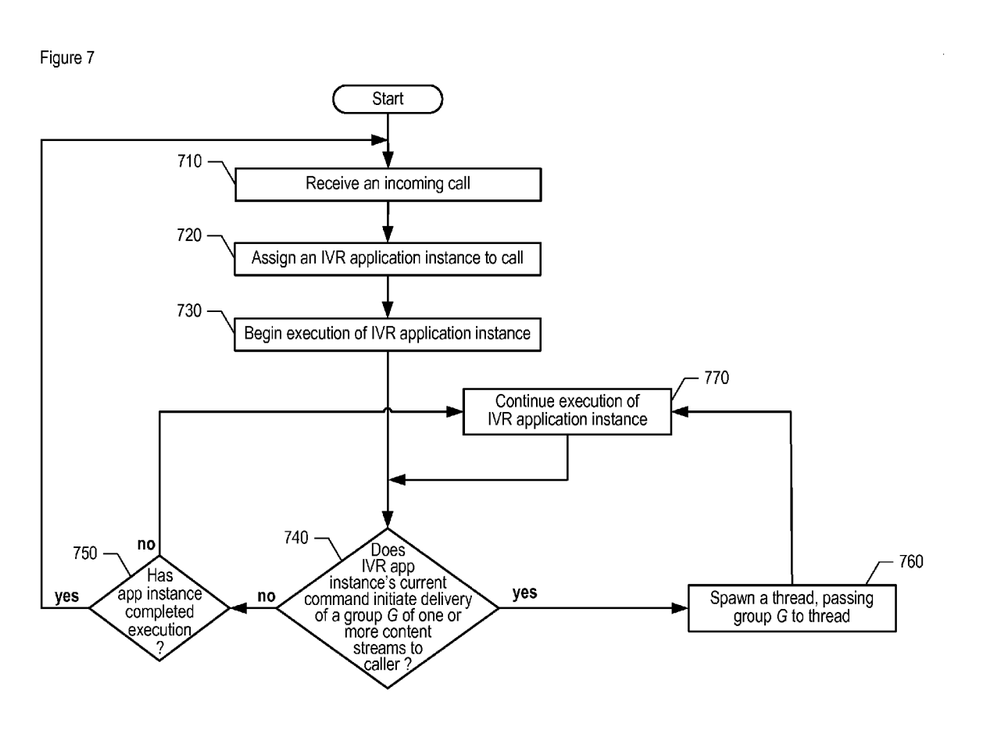
FIG. 7 depicts a flowchart of the salient tasks of interactive voice response system 320, as shown in FIG. 3, in accordance with the illustrative embodiment of the present invention.

FIG. 7 depicts a flowchart of the salient tasks of interactive voice response system 320, in accordance with the illustrative embodiment of the present invention. It will be clear to those skilled in the art which tasks depicted in FIG. 7 can be performed simultaneously or in a different order than that depicted.

At task 710, an incoming call is received at interactive voice response system 320, in well-known fashion.

At task 720, interactive voice response system 320 assigns an instance of an appropriate IVR system application to the incoming call, in well-known fashion. As will be appreciated by those skilled in the art, although in the illustrative embodiment an instance of an IVR system application handles one incoming call at a time, in some other embodiments of the present invention an application instance might handle a plurality of calls concurrently.

At task 730, interactive voice response system 320 begins executing the IVR application instance, in well-known fashion.

At task 740, interactive voice response system 320 checks whether the current command to be executed in the IVR application instance initiates delivery of a group G of one or more media streams to the calling telecommunications terminal. (In accordance with the illustrative embodiment, the <group> tag is unnecessary for the case of a single media stream.) If so, execution continues at task 760, otherwise, execution proceeds to task 750.

At task 750, interactive voice response system 320 checks whether the IVR application instance's execution has completed. If so, execution continues back at task 710 for the next incoming call; otherwise, execution proceeds to task 790.

At task 760, interactive voice response system 320 spawns a thread that is responsible for starting and stopping the delivery of media streams to the calling terminal during the call. Group G is passed to the thread, in well-known fashion (e.g., via a memory pointer, via an operating system inter-thread communication mechanism, etc.). The operation of this thread is described in detail below and with respect to FIGS. 6 through 9.

At task 770, interactive voice response system 320 continues the execution of the IVR application instance, in well-known fashion. After task 770, execution continues back at task 740.

Figure 8:
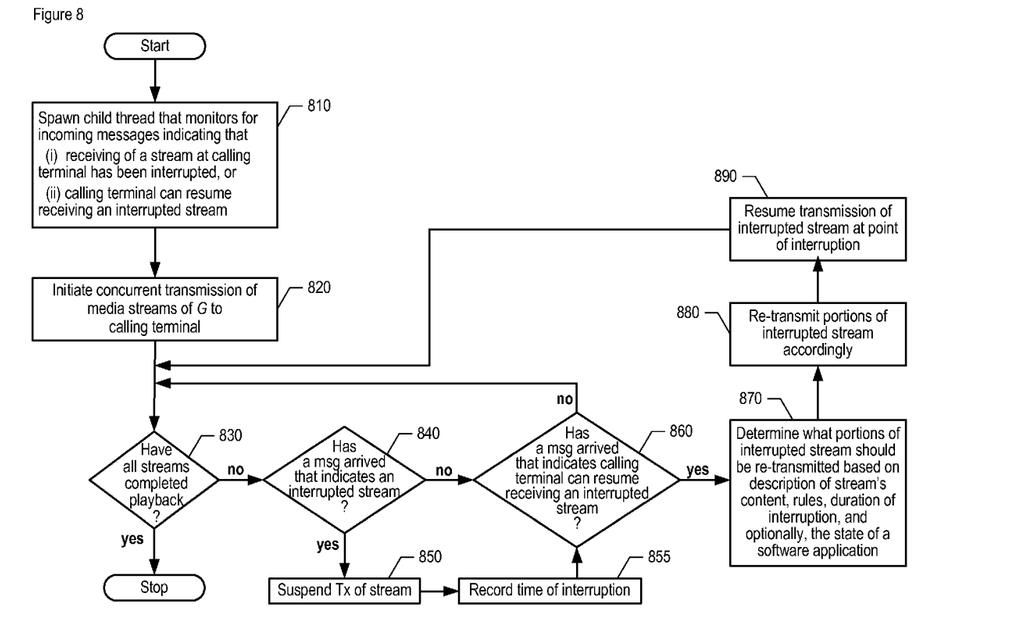
FIG. 8 depicts a flowchart of the salient tasks of a thread that is spawned at task 760 of FIG. 7, in accordance with the illustrative embodiment of the present invention.

FIG. 8 depicts a flowchart of the salient tasks of the thread spawned at task 760, in accordance with the illustrative embodiment of the present invention. It will be clear to those skilled in the art which tasks depicted in FIG. 8 can be performed simultaneously or in a different order than that depicted.

At task 810, the thread spawns a child thread that monitors for incoming messages that indicate that: (i) a media stream received at the calling terminal has been interrupted, or that (ii) the calling terminal can resume receiving an interrupted media stream. The child thread monitors for the arrival of these messages continually during the call. The child thread dies when the (parent) thread dies (i.e., after the determination of task 830, described below, is affirmative).

At task 820, the thread initiates the concurrent transmission of the content streams of G to the calling terminal, in well-known fashion.

At task 830, the thread checks whether playback of all content streams has completed. If so, the thread and its child (spawned at task 810) die, otherwise execution continues at task 840.

At task 840, the thread checks whether a message arrives that indicates that a media stream received at the calling terminal has been interrupted. If so, execution proceeds to task 850, otherwise execution continues at task 860.

At task 850, the thread suspends transmission of the interrupted media stream.

At task 855, the thread records the current time as the time at which the interruption started.

At task 860, the thread checks whether a message arrives that indicates that the calling terminal can resume receiving an interrupted media stream. If so, execution proceeds to task 870, otherwise execution continues back at task 830.

At task 870, the thread determines what portion(s) of the interrupted stream should be re-transmitted, if any, based on the description of the stream's content, the specified recovery rules, the duration of the interruption, and optionally, the state of a particular software application (e.g., the state of a transaction that is being conducted by a particular application during the call, etc.).

At task 880, the thread re-transmits portions of the interrupted stream, if necessary, in accordance with the result of task 870.

At task 890, the thread resumes transmission of the interrupted stream at the point of interruption, in well-known fashion. After task 890, execution continues back at task 830.

Figure 9:
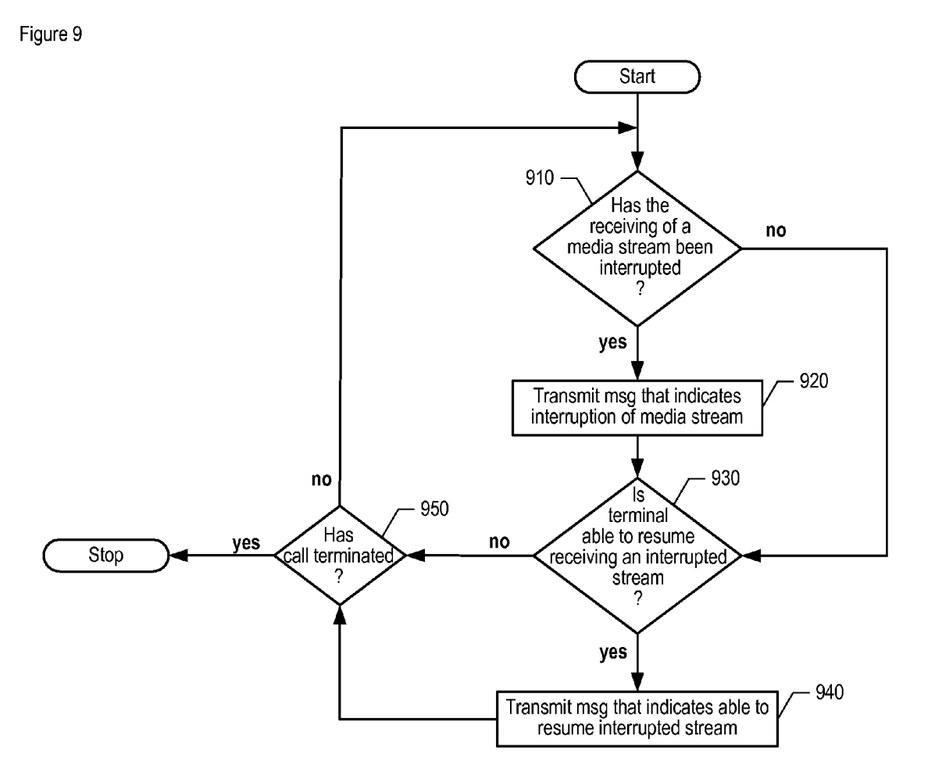
FIG. 9 depicts a flowchart of the salient tasks of telecommunications terminal 301, as shown in FIG. 3, during a call with interactive voice response system 320, in accordance with the illustrative embodiment of the present invention.

FIG. 9 depicts a flowchart of the salient tasks of telecommunications terminal 301 during a call with interactive voice response system 320, in accordance with the illustrative embodiment of the present invention.

At task 910, telecommunications terminal 301 checks whether the receiving of a media stream at the terminal has been interrupted, in well-known fashion. If so, execution proceeds to task 920, otherwise execution continues at task 930.

At task 920, telecommunications terminal 301 transmits a message to interactive voice response system 320 that indicates the interruption of the media stream.

At task 930, telecommunications terminal 301 determines whether it is able to resume receiving an interrupted stream (for example, by monitoring the quality-of-service for signals received at the terminal, as is well-known in the art). If so, execution proceeds to task 940, otherwise execution continues at task 950.

At task 940, telecommunications terminal 301 transmits a message to interactive voice response system 320 that indicates that the terminal is able to resume receiving an interrupted media stream.

At task 950, telecommunications terminal 301 checks whether the call has terminated. If so, the method of FIG. 9 terminates, otherwise execution continues back at task 910.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    transmitting a media stream to a telecommunications terminal;
    receiving, during the transmission of said media stream, a first signal that indicates that said telecommunications terminal has stopped receiving said media stream;
    receiving, after said first signal, a second signal that indicates that said telecommunications terminal can resume receiving said media stream; and
    re-transmitting to said telecommunications terminal, in response to said second signal, one or more portions of said media stream that were already received by said telecommunications terminal prior to the generation of said first signal;
    wherein said media stream comprises one or more segments; and
    wherein each of the segments is associated with a respective category that characterizes what the segment is; and
    wherein said one or more portions of said media stream are determined based, at least in part, on the category of one or more of the segments.

2. The method of claim 1 further comprising, after the re-transmission, resuming transmission of said media stream at the point at which said telecommunications terminal stopped receiving said media stream.

3. The method of claim 1 wherein the determination of said one or more portions is also based on the elapsed time between the receiving of said first signal and the receiving of said second signal.

4. The method of claim 1 wherein the determination of said one or more portions is also based on the media type of said media stream.

5. The method of claim 1 wherein said media stream is transmitted during a call between said telecommunications terminal and an interactive voice response system, and wherein the determination of said one or more portions is also based on the state of a software application of said interactive voice response system.

6. A method comprising:
   transmitting a media stream to a telecommunications terminal;
   receiving, during the transmission of said media stream, a first signal that indicates that said telecommunications terminal has stopped receiving said media stream;
   receiving, after said first signal, a second signal that indicates that said telecommunications terminal can resume receiving said media stream; and
   re-transmitting to said telecommunications terminal, in response to said second signal, one or more portions of said media stream that were already received by said telecommunications terminal prior to the generation of said first signal;
   wherein said media stream comprises one or more segments; and
   wherein each of the segments is associated with a respective category that characterizes what the segment is; and
   wherein said one or more portions of said media stream are determined based on
      (i) the category of one or more of the segments, and
      (ii) a non-empty set of rules for playing an interrupted media streams based, at least in part, on a category of a segment of the interrupted media stream.

7. The method of claim 6 wherein a segment of the media stream is categorized as an advertisement, and wherein said non-empty set of rules comprises a rule for playing advertisements.

8. The method of claim 6 wherein a segment of the media stream is categorized as a song.

9. The method of claim 6 wherein said non-empty set of rules indicates whether uninterrupted playback of a particular portion of said media stream is required.

10. The method of claim 6 wherein said non-empty set of rules indicates whether uninterrupted playback of the entire media stream is required.

11. The method of claim 6 wherein a segment of the media stream is categorized as filler during which the user of said telecommunications terminal waits.

12. The method of claim 6 wherein said media stream is transmitted during a call between said telecommunications terminal and an interactive voice response system, and wherein the determination of said one or more portions is also based on the state of a software application of said interactive voice response system.

13. A method comprising:
   transmitting a media stream to a telecommunications terminal;
   receiving, during the transmission of said media stream, a first signal that indicates that said telecommunications terminal has stopped receiving said media stream;
   receiving, after said first signal, a second signal that indicates that said telecommunications terminal can resume receiving said media stream; and
   re-transmitting to said telecommunications terminal, in response to said second signal, one or more portions of said media stream that were already received by said telecommunications terminal prior to the generation of said first signal;
   wherein said one or more portions of said media stream are determined based on the elapsed time between the receiving of said first signal and the receiving of said second signal.

14. The method of claim 13 wherein the determination of said one or more portions is also based on the media type of said media stream.

15. The method of claim 13 wherein said media stream is transmitted during a call between said telecommunications terminal and an interactive voice response system, and wherein the determination of said one or more portions is also based on the state of a software application of said interactive voice response system.

16. A method comprising:
   transmitting, concurrently, a first media stream and a second media stream to a telecommunications terminal;
   receiving, during the transmission of said first media stream and said second media stream, a first signal that indicates that said telecommunications terminal has stopped receiving said first media stream but is still receiving said second media stream;
   receiving, after said first signal, a second signal that indicates that said telecommunications terminal can resume receiving said first media stream; and
   re-transmitting to said telecommunications terminal, in response to said second signal, one or more portions of said first media stream that were already received by said telecommunications terminal prior to the generation of said first signal;
   wherein said first media stream comprises one or more segments; and
   wherein each of the segments is associated with a respective category that characterizes what the segment is; and
   wherein said one or more portions of said first media stream are determined based, at least in part, on the category of one or more of the segments.

17. The method of claim 16 wherein said second media stream also comprises one or more segments, and wherein each of the segments of the second media stream is also associated with a respective category that characterizes what the segment is, and wherein the determination of said one or more portions is also based on the category of one or more of the segments of said second media stream.

18. The method of claim 16 wherein the determination of said one or more portions of said first media stream is also based on the elapsed time between the receiving of said first signal and the receiving of said second signal.

19. The method of claim 16 wherein the determination of said one or more portions is also based on at least one of: the media type of said first media stream, and the media type of said second media stream.

20. The method of claim 16 wherein said first media stream and said second media stream are transmitted during a call between said telecommunications terminal and an interactive voice response system, and wherein the determination of said one or more portions is also based on the state of a software application of said interactive voice response system.

* * * * *